(12) United States Patent
Kim

(10) Patent No.: US 6,410,864 B1
(45) Date of Patent: Jun. 25, 2002

(54) LIQUEFIED GAS AMOUNT MEASURING DEVICE

(75) Inventor: David Kim, Tamshui Chen (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 64 days.

(21) Appl. No.: 09/690,985

(22) Filed: Oct. 18, 2000

(51) Int. Cl.[7] .................. G01F 23/20; G01G 19/56; G01G 23/14; G01G 3/02
(52) U.S. Cl. .................. 177/148; 177/169; 177/177; 177/232; 177/154; 177/156; 73/296
(58) Field of Search .................. 177/148, 149, 177/232, 245, 225, 231, 126, 168, 169, 177, 154, 156, 159; 73/296

(56) References Cited

U.S. PATENT DOCUMENTS

| | | | | |
|---|---|---|---|---|
| 3,319,730 A | * | 5/1967 | Cuddon-fletcher | 177/245 |
| 4,382,478 A | * | 5/1983 | Hearn | 177/169 |
| 4,413,515 A | * | 11/1983 | Quinn | 73/296 |
| 4,712,713 A | * | 12/1987 | Karlis et al. | 177/225 |
| 5,031,710 A | * | 7/1991 | Parker et al. | 177/148 |
| 5,033,449 A | * | 7/1991 | Hanagan | 73/296 |
| 5,056,364 A | * | 10/1991 | Kahler et al. | 73/296 |
| 5,112,319 A | * | 5/1992 | Lai | 177/225 |
| 5,686,704 A | * | 11/1997 | Simser | 177/225 |
| 6,121,555 A | * | 9/2000 | Nowosielski et al. | 177/225 |
| 6,148,668 A | * | 11/2000 | Sieg | 73/296 |

* cited by examiner

*Primary Examiner*—Randy W. Gibson
(74) *Attorney, Agent, or Firm*—Rosenberg, Klein & Lee

(57) ABSTRACT

A liquefied gas amount measuring device includes an electronic display, a retractable cylinder, a grip element, and a hooking lug. The retractable cylinder includes a cylinder body having a retractable rod fitted with a spring at an intermediate section thereof placed therein. One end of the retractable rod extends out of the cylinder body for suspension of the hooking lug to pull out the retractable rod so as to compress the spring in the cylinder body to generate a resilient force after release of pulling force. The other end of the retractable rod that extends out of the cylinder body has a conductive elastic plate bent therefrom at a suitable position. A detecting circuit board is erected in the cylinder corresponding to range of displacement of the elastic plate moved by the retractable rod when pulled. A plurality of detecting circuits on the circuit board are connected when pressed by the elastic plate. Signal input/output ends of the detecting circuit have a lead wire extending out of the cylinder body to the electronic display. The grip element extends horizontally from the cylinder body at a suitable position. When measuring the gas amount, the hooking lug hooks on an ear of the liquefied gas container and the gas container is lifted. By utilizing the weight of the gas container that pulls the retractable rod, corresponding detecting currents are generated to the electronic display to cause it to send a gas amount reporting signal.

3 Claims, 4 Drawing Sheets

LIQUEFIED GAS AMOUNT MEASURING DEVICE

BACKGROUND OF THE INVENTION (a) Field of the Invention

The present invention relates to a liquefied gas amount measuring device, more particularly to a gas amount measuring device that can convert weights of liquefied gas containers of different gas amounts into electronic indications. Hence, a suspension method can be adopted to facilitate operation and to obtain more accurate gas amount measurements.

(b) Description of the Prior Art

For users of liquefied gas in containers, it is difficult to find out the amount of gas remaining in the gas container. For restaurants or cafeterias that use liquefied gas, spare full gas containers have to be prepared to ensure gas supply, which may be dangerous if not carefully stowed in view of possible gas leakage and gas explosion.

There is available a kind of gas pressure measuring device for connection to a gas outlet pipe of a liquefied gas container for measuring concentration of gas therein so as to determine the amount of remaining gas. However, since the pressure of gas will vary according to temperature, the measurement will not be accurate.

SUMMARY OF THE INVENTION

The object of the present invention is to provide a liquefied gas amount measuring device to permit more accurate measuring of gas in a liquefied gas container. According to the invention, the measuring device can convert weight of gas containers of different gas amounts into electrical signals for display. Since gas is being consumed during use and since air cannot enter the gas container, with each gas container having a standard weight, the measuring device of this invention can accurately measure the amount of gas inside the gas container, without being affected by changes in temperature. Hence, the user can be aware of the amount of gas remaining the gas container before each use.

Another object of this invention is to provide a liquefied gas amount measuring device that can accurately measure the amount of gas inside the gas container in a simple and safe way by suspending and measuring the weight of the gas container. There is no need to measure the gas pressure, which requires threaded engagement at the output pipe of the gas container. If the engagement is not tight, gas may leak, which may result in gas poisoning.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
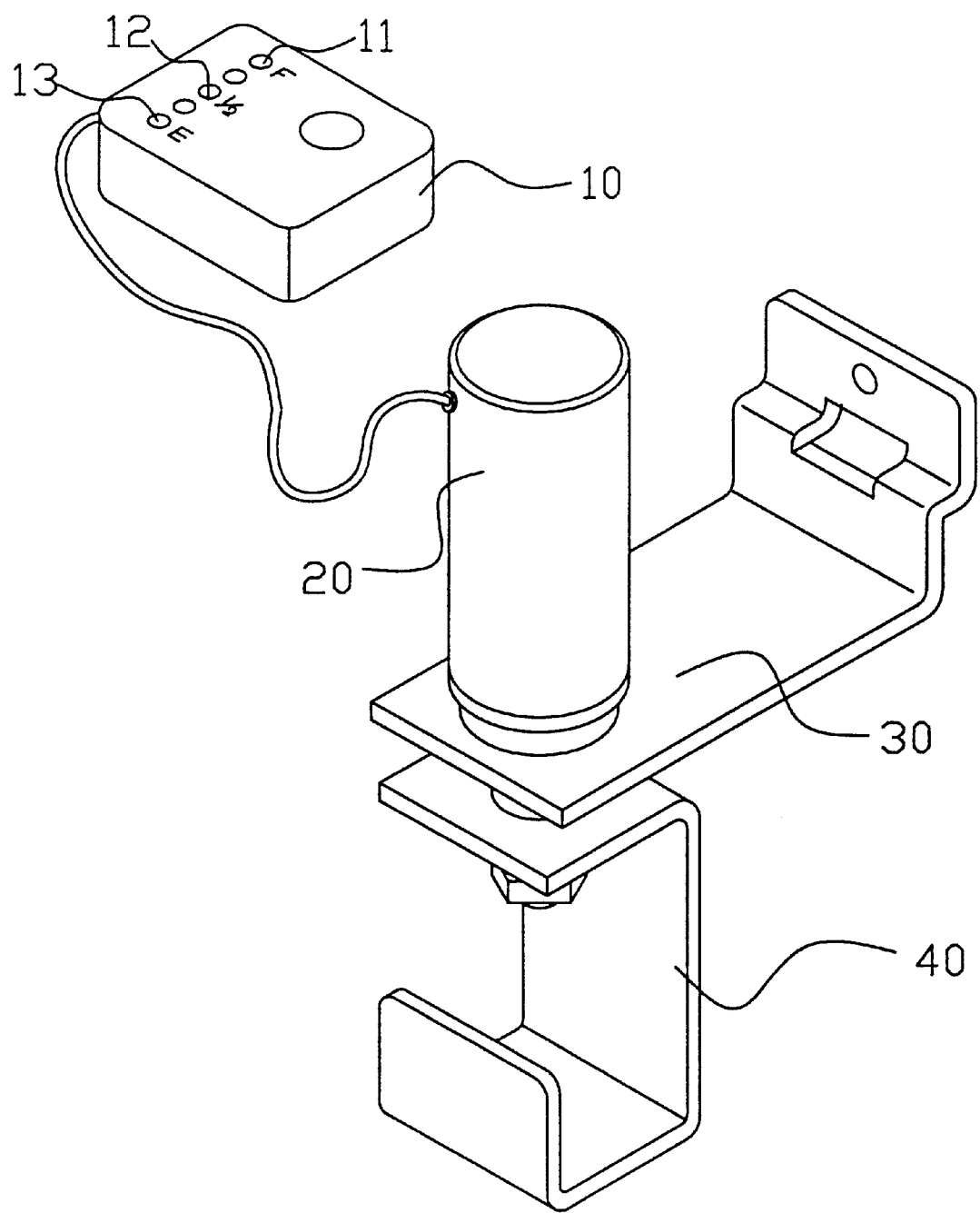
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
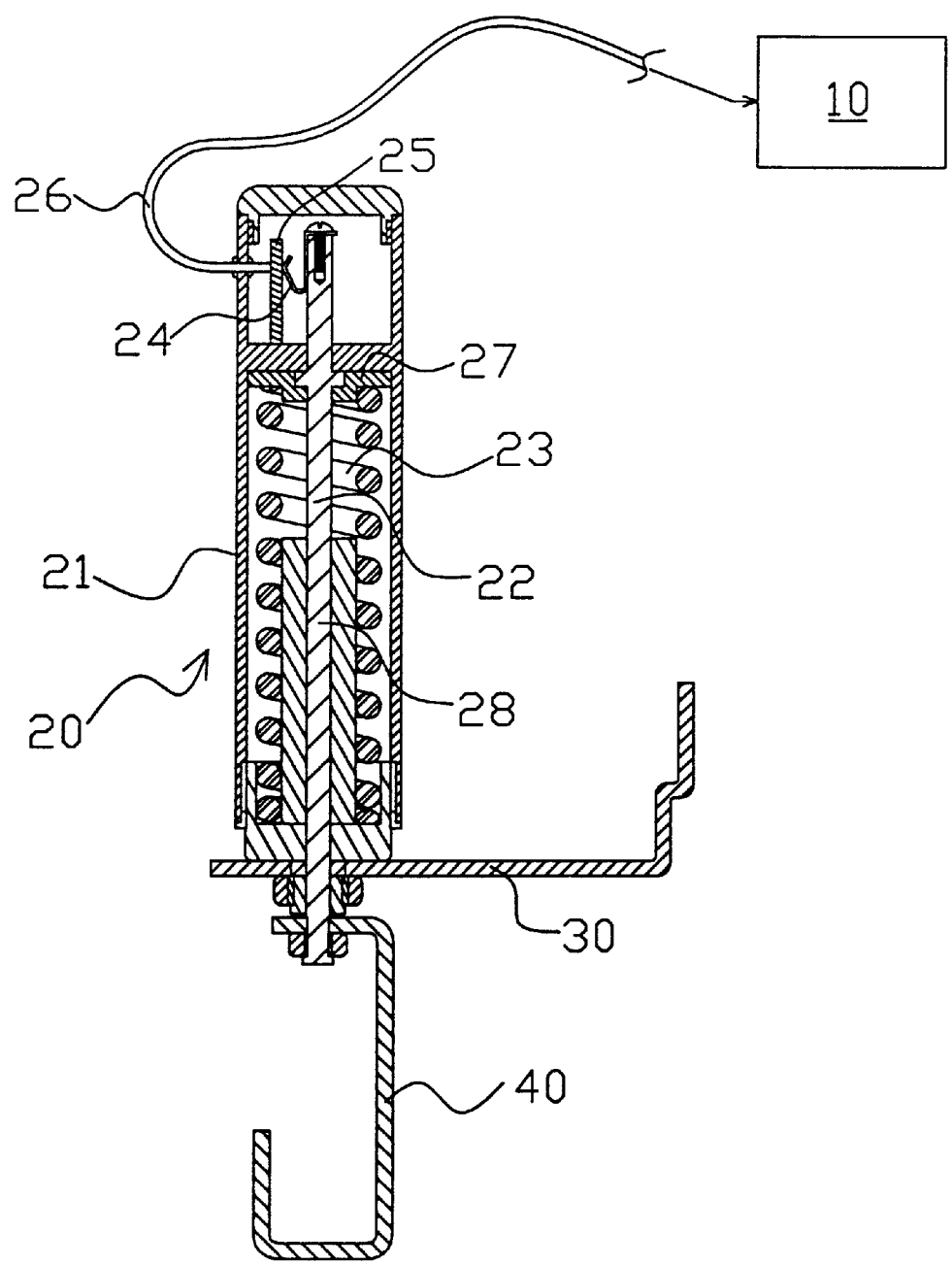
FIG. 2 is a structural sectional view of FIG. 2.

With reference to FIGS. 1 and 2, a liquefied gas amount measuring device 1 of the invention includes an electronic display 10, a retractable cylinder 20, a grip element 30, and a hooking lug 40. The retractable cylinder 20 includes a cylinder body 21 having a retractable rod 22 fitted with a spring 23 at an intermediate section thereof placed therein such that one end of the spring 23 abuts against the cylinder wall, the other end thereof abutting against a spring seat 27 on the retractable rod 22. One end of the retractable rod 22 extends out of the cylinder body 21 for suspension of the hooking lug 40 to pull out the retractable rod 22 so as to compress the spring 23 in the cylinder to generate resilient force after release of the pulling force. The other end of the retractable rod 22 extends out of the cylinder body 21 has a conductive elastic plate 24 bent therefrom at a suitable position. A detecting circuit board 25 is erected in the cylinder 21 corresponding to the range of displacement of the elastic plate 24 moved by the retractable rod 22 when pulled. The plurality of detecting circuits on the circuit board 25 can be connected when pressed by the elastic plate 24. The signal input/output ends of the detecting circuit 25 have a lead wire 26 extending out of the cylinder body 21 to the electronic display 10. The surface of the electronic display 10 has exposed thereon a plurality of indicator lights 11, 12, 13, . . . for indicating different gas amounts, and its electric connection with the circuit board 25 can have the same electric action as a variable resistance, and the resistance value thereof can be changed by action of the elastic plate 24 to turn on indicator lights (11 or 12 or 13 or, . . . ) of the corresponding values so as to apprise the operator. The grip element 30 extends horizontally from the cylinder body 21. At the inner cylinder end where the retractable rod 22 extends from the cylinder body 21, a limiting sleeve 28 is erected to fit into the retractable rod 22. The limiting sleeve 28 is lower than the spring 23 and is enclosed by the spring 23. When the spring seat 27 on the retractable rod 22 for abutting the spring 23 presses the spring 23 to contact the limiting sleeve 28, it will be limited thereby and cannot compress downwardly any further. By utilizing the height of the limiting sleeve 28, the lowermost dead point position of compression of the spring 23. can be limited.

Figure 4:
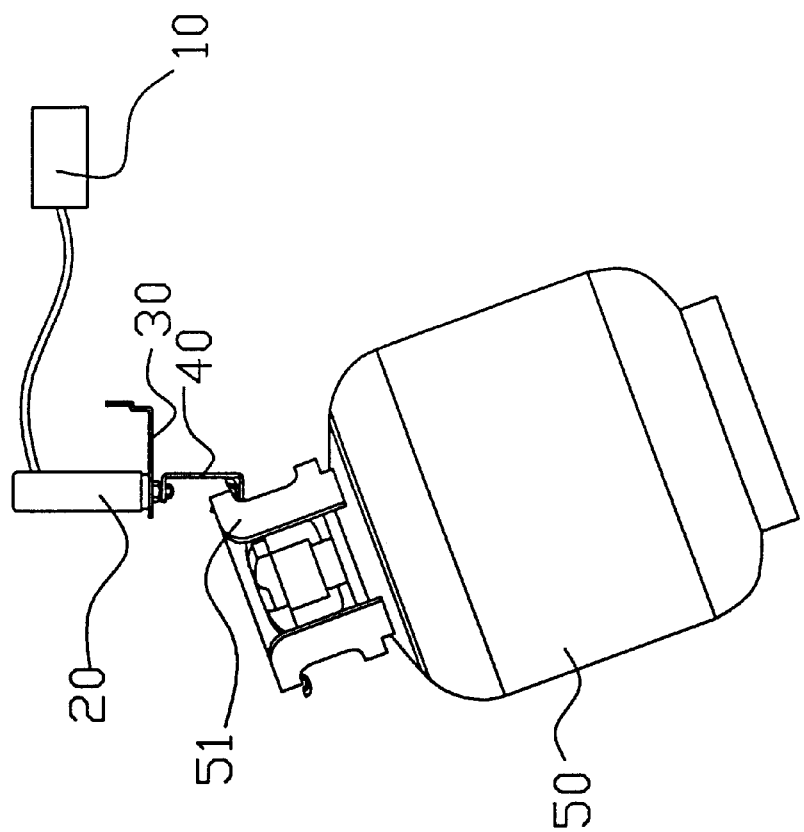
FIGS. 3 and 4 are schematic views illustrating operation of the invention.
Figure 3:
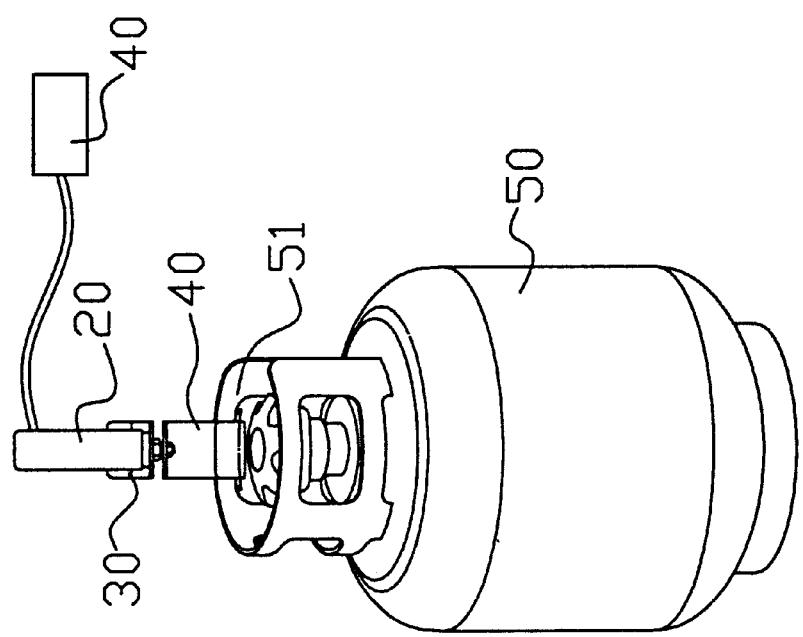
Figure 5:
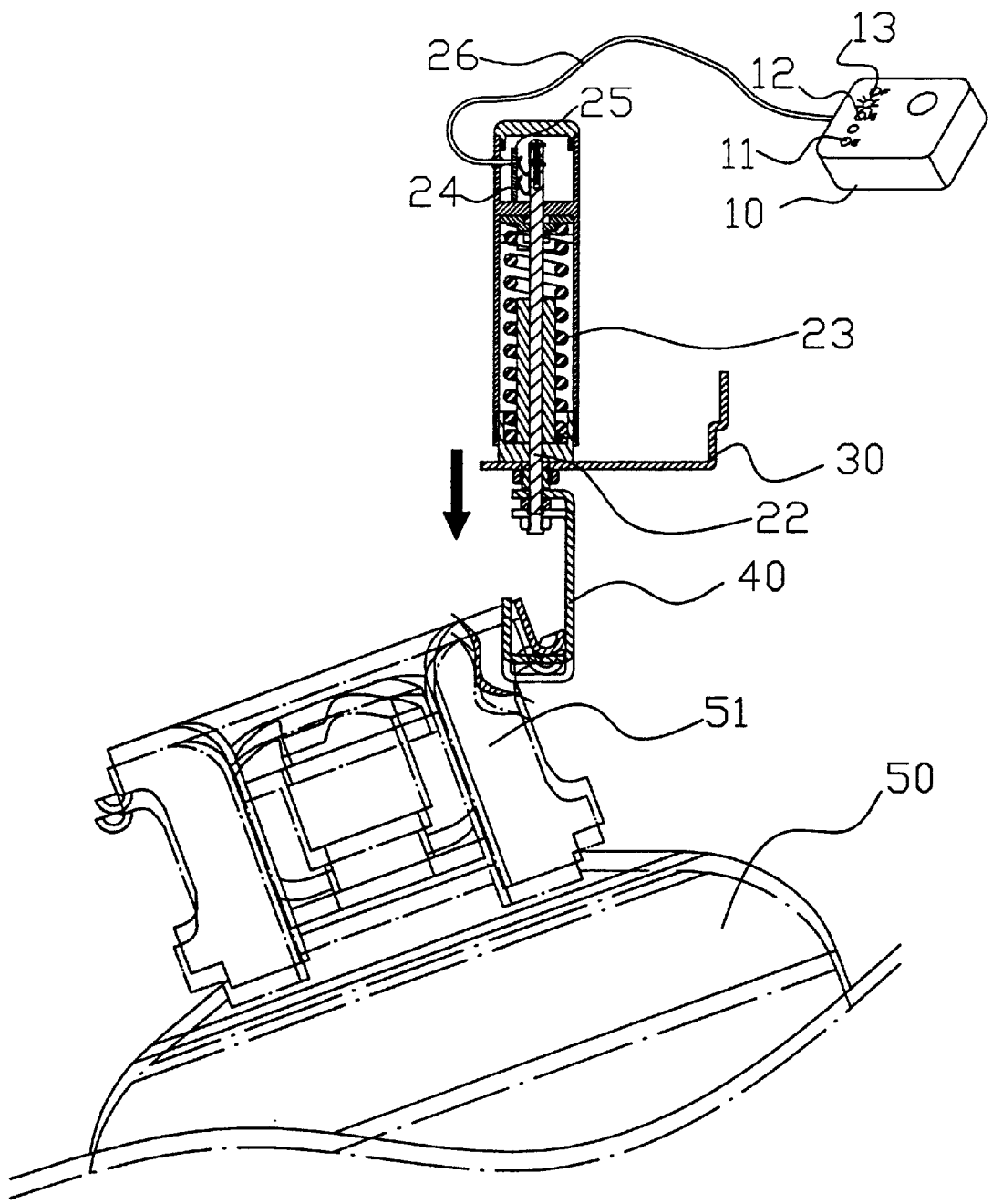
FIG. 5 is a schematic view illustrating operation of the invention.

When measuring the amount of gas, with reference to FIGS. 3 and 4, the hooking lug 40 is hooked on to an ear 51 of the gas container, and the gas container 50 is lifted by means of the grip element 30. By using the weight of the gas container to pull the retractable rod, corresponding detecting currents are generated to the electronic display 10 to cause it to send a gas amount reporting signal. The detailed operation thereof is shown in FIG. 5. Since different gas amounts will pose different weights upon the retractable rod 22 to force the spring 23 to generate a corresponding compression amount to move the elastic plate 24 to the detecting circuit board at the corresponding detecting circuit, connection is made at the circuit to generate a corresponding detecting current to the electronic display 10 to cause it to send a reporting signal corresponding to the gas amount.

From the aforesaid, it can be seen that the gas amount measuring device of the invention has an enhanced measuring effect and is not subject to the influence of temperature changes.

It will be understood that each of the elements described above, or two or more together may also find a useful application in other types of methods differing from the type described above.

While certain novel features of this invention have been shown and described and are pointed out in the annexed claim it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A liquefied gas amount measuring device comprising an electronic display, a retractable cylinder, a grip element, and a hooking lug, said retractable cylinder including a cylinder body having a retractable rod fitted with a spring at an intermediate section thereof placed therein, one end of said spring abutting against the cylinder wall, the other end thereof abutting against a spring seat on said retractable rod, one end of said retractable rod extending out of said cylinder body for suspension of said hooking lug to pull out said retractable rod so as to compress said spring in said cylinder body to generate a resilient force after release of pulling force, the other end of said retractable rod extending out of said cylinder body having a conductive elastic plate bent therefrom at a suitable position, a detecting circuit board being erected in said cylinder corresponding to range of displacement of said elastic plate moved by said retractable rod when pulled, a plurality of detecting circuits on said circuit board being connected when pressed by said elastic plate, signal input/output ends of said detecting circuit having a lead wire extending out of said cylinder body to said electronic display, said grip element extending horizontally from said cylinder body at a suitable position.

2. The liquefied gas amount measuring device of claim 1, wherein a limiting sleeve is erected to fit into said retractable rod at an inner cylinder end' where said retractable rod extends from said cylinder body, said limiting sleeve being lower than said spring and being enclosed by said spring.

3. The liquefied gas amount measuring device of claim 1 or 2, wherein said electronic display has a surface provided with a plurality of indicator lights for indicating different gas amounts, electric connection of said electronic display with said circuit board having the same electric action as a variable resistance, the resistance value thereof being changeable by action of said elastic plate to turn on indicator lights of the corresponding values.

* * * * *